Feb. 15, 1938.  G. A. PERLEY  2,108,293
APPARATUS FOR MEASURING ION CONCENTRATION
Filed Jan. 10, 1936  3 Sheets-Sheet 1
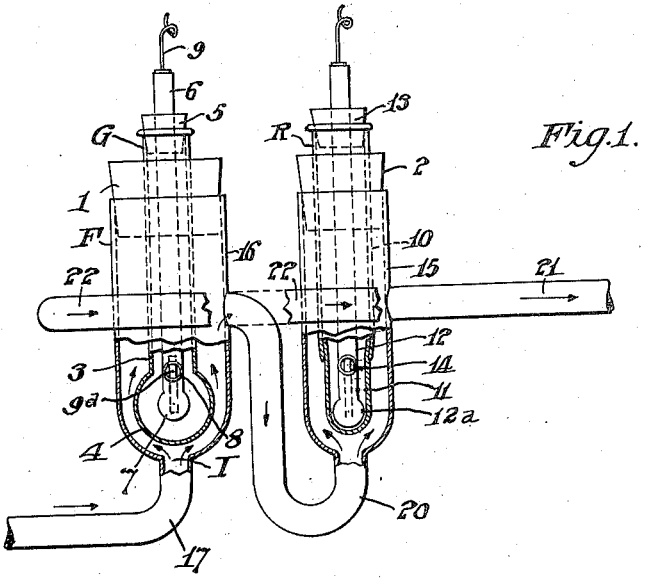

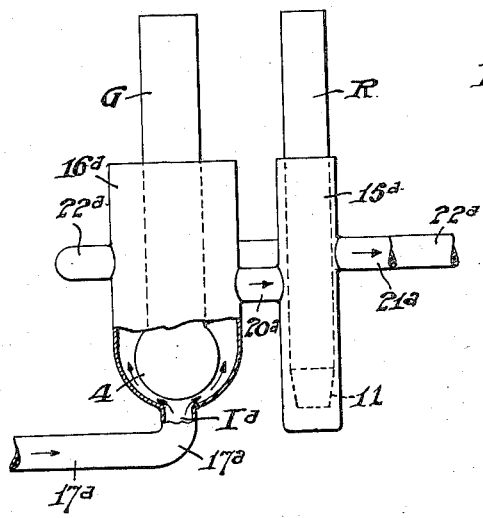
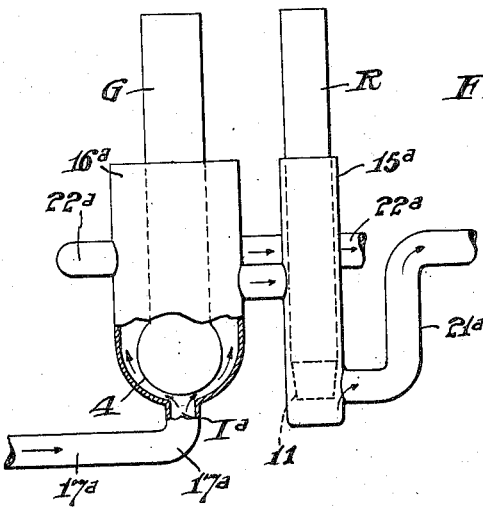
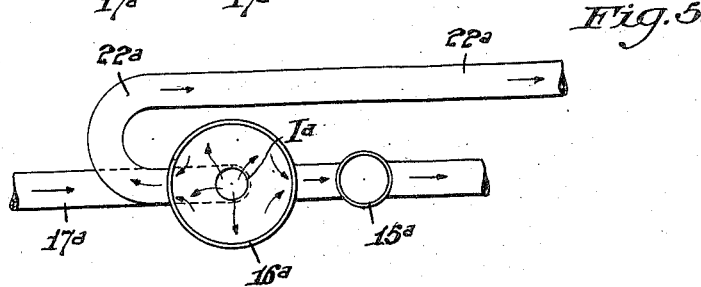

Feb. 15, 1938.　　　　G. A. PERLEY　　　　2,108,293
APPARATUS FOR MEASURING ION CONCENTRATION
Filed Jan. 10, 1936　　　3 Sheets-Sheet 3
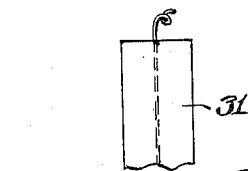
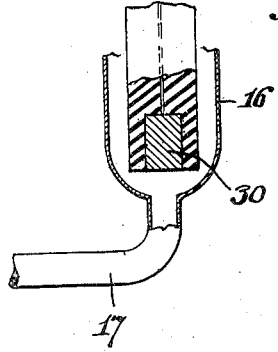
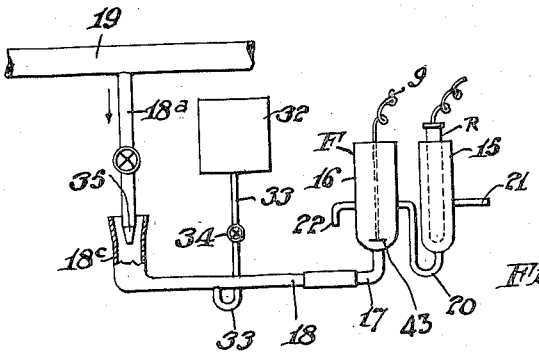
Inventor
George A. Perley
By Cornelius D. Ehret
Attorney.

Patented Feb. 15, 1938

2,108,293

UNITED STATES PATENT OFFICE 2,108,293

APPARATUS FOR MEASURING ION-CONCENTRATION

George A. Perley, Philadelphia, Pa., assignor to Leeds & Northrup Company, Philadelphia, Pa., a corporation of Pennsylvania Application January 10, 1936, Serial No. 58,554

6 Claims. (Cl. 204—5)

My invention relates to apparatus for determining the ion-concentration of a solution and particularly to ion-concentration cells utilizing glass electrodes.

In accordance with my invention, the solution upon and adjacent the active surface of a hydrogen-ion electrode is agitated to avoid the long time-lag otherwise necessary before the cell voltage assumes a steady value corresponding to the ion-concentration of the solution.

More particularly, the electrode is disposed in a flow-channel so constructed that an incoming stream of the solution under measurement directly impinges upon the active or sensitive surface of the electrode, preferably as it enters the flow-channel, to obtain high turbulence of the solution in contact with and adjacent the active surface; preferably a gas, as air, is introduced into the stream of solution prior to its entry into the flow-channel to increase the agitation of the solution at and adjacent the electrode.

My invention further resides in the features of construction and arrangement hereinafter described and claimed.

For an understanding of my invention reference is to be had to the accompanying drawings in which:

Fig. 1 is a front elevational view with parts in section of an ion-concentration cell embodying the invention;

Fig. 2 is a plan view of Fig. 1 with the cell electrodes omitted;

Fig. 3 diagrammatically illustrates a measuring system utilizing the ion-concentration cell of Fig. 1;

Figs. 4 and 4a are front elevational views of parts in section of modified forms of the ion-concentration cell;

Fig. 5 is a plan view of Fig. 4 with the cell electrodes omitted;

Fig. 6 illustrates another type of hydrogen-ion electrode;

Fig. 7 diagrammatically illustrates a modification using a quinhydrone electrode;

Fig. 8 illustrates a system using a modified form of flow channel; and

Fig. 9 diagrammatically illustrates another system utilizing the invention.

The ion-concentration cell shown in Fig. 1 comprises the glass electrode G and the reference electrode R suitably held in position in the flow channel or housing F by the plugs or stoppers 1 and 2, respectively. The glass electrode comprises the tube 3, of glass, having at its lower end a bulb 4 whose wall is extremely thin as, for example, between 0.001 and 0.0001 inch and which forms the active or sensitive surface of the glass electrode.

Within the tube 3 is suitably positioned, as by the stopper or plug 5, a second tube 6 having a bulb 7 at its lower end and an opening 8. The bulb 7 of the internal tube 6 is partly filled with solid quinhydrone, for example; the remainder of tube 6 is filled with a dilute hydrochloric acid solution, approximately one-tenth normal for example. The same solution is disposed in the outer tube 3 to a level at least above the hole 8 in the inner tube 6. The conductor 9, of copper or other suitable metal, extends downwardly through the tube 6 for electrical connection with an electrode 9a of platinum, gold or other suitable metal, in contact with the solution in the tubes. As an alternative, the platinum or gold electrode may be replaced with a chloridized silver-plated platinum or chloridized silver electrode in which case the solution used in tube 6 is hydrochloric acid instead of quinhydrone and hydrochloric acid.

The reference electrode comprises the tube 10 whose lower end receives the tube or capsule 11. The engaging surfaces of tubes 10 and 11 form a ground glass joint which, however, should not be so tight as to prevent maintenance of a moist surface at the joint. The inner tube 12, which is suitably held in position as by the stopper 13, is provided at its lower end with a small bulb 12a which is partially filled with mercury, as through the hole 14 to which is added a modicum of mercurous chloride and a few crystals of potassium chloride. The mixture is moistened with a saturated solution of potassium chloride and shaken vigorously to form an emulsion of mercurous chloride and mercury globules. The outer tube 10 is partially filled with a saturated potassium chloride solution and the capsule or tube 11 rotated slightly to allow moistening of the ground glass joint. The level of the solution in the outer tube should be above the hole 14 in the inner tube and above the level of the solution being measured when the reference electrode is disposed within the chamber 15 of the flow channel F. Likewise, the level of the solution within the glass electrode should be above the level of the solution in chamber 16 of the flow channel.

Referring to Fig. 3, the inlet 17 to the glass-electrode chamber 16 is connected, as by tube 18, to the conduit 19 through which the solution, whose hydrogen ion-concentration, for example, is to be measured, is flowing. The stream diverted from the conduit 19 enters the chamber 16 of the flow channel and passes out of chamber 16 through the tube 20 into the reference electrode chamber 15 and discharges therefrom through the outlet pipe 21.

The potential developed by the ion-concentration cell is measured in any suitable manner; the measuring network, shown in Fig. 3, a preferred arrangement, is specifically described and claimed in copending application Serial No. 58,623, filed January 11, 1936. Briefly, the glass electrode G of the ion-concentration cell is connected to the control electrode CE of a vacuum tube V and the reference electrode of the cell is connected to contact C adjustable along the slidewire SW. One terminal of the slidewire is connected to the cathode H of tube V, and a standard or predetermined amount of current is passed through the slidewire through the path including the resistance D. The galvanometer GA is connected between a point along the resistance R1, in circuit with the output electrode OE of the tube V, and a point along the slidewire SW1, included in circuit between the positive terminal of the battery B and the cathode H of the tube. To determine the ion-concentration of the solution contact C is adjusted along the slidewire SW until there is zero or null deflection of the galvanometer; the concentration is then read from the scale S associated with the movable elements of the slidewire. For continuous measurements, the adjustment of contact C, in response to deflection of galvanometer GA, may be effected by mechanical relay mechanism of the type disclosed in Squibb Patent No. 1,935,732.

Since the ion-concentration of the solution under measurement may change rapidly, it is essential there should be no time lag in the ion-concentration cell. It has been observed that when a glass electrode is immersed in a tank of solution, ten minutes or more is required for the electrode to assume a steady potential corresponding to the ion-concentration of the solution. To reduce this time lag so that the cell voltage may closely follow the changes in concentration of the solution, a flow-channel has been so constructed that the incoming test solution impinges directly upon the active part of the glass electrode as it enters the flow-channel to create substantial turbulence on the active or sensitive surface of the bulb.

As clearly shown in Fig. 1, the sensitive surface 4, or bulb, of the glass electrode G is disposed adjacent the inlet I to chamber 16 whose internal dimensions are such that the passage for flow of the solution is rather restricted; consequently, the bulb is constantly washed by fresh solution, which would not be the case, for example, if the inlet I were above the bulb 4. With the construction and arrangement shown, the glass electrode is very responsive to changes in ion-concentration of the solution, and permits rapid and accurate measurement to be made.

Preferably, a gas, as air, is introduced into the stream of solution flowing toward the flow-channel F in order that the stream entering the chamber 16 may contain many gas bubbles since I have discovered that the effectiveness of the scouring action of the solution upon the active surface of the electrode may thus be substantially enhanced. The introduction of air may be effected by the entraining action of the moving stream itself; for example, as shown in Fig. 3, the stream is permitted to fall in or into the chamber 18b and in so doing entrains air which is carried in bubble form through tube 17 into the chamber 16. Preferably, as disclosed and claimed in aforesaid copending application Serial No. 58,623, the stream is caused to break into drops as it falls. The bubbles of gas in seeking escape in chamber 16 agitate the liquid at and near the active surface of the electrode G and so are effective in maintaining high sensitivity of the electrode to changes in the ion-concentration of the solution.

To increase the amount of solution available to wash the electrode in a unit of time, there is provided an auxiliary outlet 22 for chamber 16 which permits discharge of the excess solution directly to waste, or other destination without requiring it to pass through tube 20 and the reference electrode chamber 15.

The flow-channel shown in Figs. 4 and 5 is generally similar to that shown in Figs. 1 and 2 and need be only briefly described. The inlet Ia for the glass electrode chamber 16a is so disposed that the incoming solution directly impinges upon the active surface 4 of the glass electrode. Part of the solution passes through the connecting tube 20a into the reference electrode chamber 15a from which it discharges through the outlet 21a. The remainder of the solution passes out of the glass electrode chamber 16a through the outlet conduit 22a without passing through the reference electrode chamber. Also with this construction of the flow-channel, the glass electrode is very sensitive to changes in ion-concentration of the solution, and the cell may therefore be used for continuous measurements of the ion-concentration of a stream of solution.

The modification shown in Fig. 4a is similar to Fig. 4 except the outlet conduit 21a extends from the bottom of the chamber 15a. The advantage of this construction is that the reference electrode R is in the direct path from chamber 16a to outlet 21a wherefore the electrode is at substantially the same temperature as the glass electrode. The construction shown in Fig. 1 also has this advantage. Furthermore, with the construction of Fig. 1 or 4a, there can be no collection of sediment adjacent either of the electrodes because of the movement of the solution and the location of the inlet and outlet ports in the electrode chambers.

My invention may be utilized to advantage with hydrogen-ion electrodes other than the glass electrode types; for example, with the antimony, or quinhydrone types. The antimony electrode shown in Fig. 6 comprises a cylindrical block 30 of antimony embedded in the cylinder 31 of hard rubber or equivalent. The lower face of the antimony block is exposed and, when the electrode is in position in chamber 16 of the flow channel, is in contact with the turbulent incoming solution. The reference electrode may be a calomel half-cell as in the arrangements previously described.

A modification utilizing the quinhydrone type of electrode is shown in Fig. 7. Quinhydrone solution from reservoir 32 is fed through pipe 33 to the stream flowing through pipe 18 to the ion-concentration cell at a rate determined by the setting of valve 34. The electrode 43 is a plate or disk of gold or platinum disposed in chamber 16 adjacent the inlet so that its surface is constantly washed by the incoming solution. The reference electrode may be a calomel half-cell of the construction previously described.

By entraining air in the solution flowing to the ion-concentration cell, the sensitivity of the cell to rapid changes in ion-concentration is maintained. In Fig. 7, the pipe 18a terminates in a nozzle 35 from which a jet of the solution issues. The jet entrains air which is carried along with the stream of solution, the mixture of air and fluid passing through chamber 18c and pipe 18 to the inlet of the flow-channel F.

In the arrangement shown in Fig. 8, both the hydrogen-ion electrode G, which may be of the glass or antimony type, and the reference electrode R are disposed within a single chamber 16b, thus insuring substantial equality of the temperatures of the electrodes. The hydrogen-ion electrode G, of any suitable type such as a glass, or antimony electrode previously described, is disposed adjacent the inlet and in the direct path of the solution between the inlet and the outlet of the flow-channel chamber 16b. With this construction, there can be no collection of sediment near the bulbs and the solution, particularly at and near the active surface of the hydrogen-ion electrode, is in a state of continuous agitation maintaining the sensitivity of the cell high to changes in ion-concentration.

While my invention is particularly of value for continuous measurement of the ion-concentration of a flowing stream of solution, it may also be utilized to advantage for measurement of the ion-concentration of a batch or successive batches of solution.

As shown in Fig. 9, the solution under measurement is disposed in a tank or container 22. In order to obtain a quick and accurate measurement of the ion-concentration of the cell, the solution is agitated as by the stirring element 23 driven, for example, by the electric motor 24. Rapid measurements of successive batches of solution of substantially the same composition, but of a different ion-concentration is possible since the agitation of the solution, particularly at and adjacent the active surface of the hydrogen-ion electrode, causes the cell voltage rapidly to assume the magnitude corresponding to the ion-concentration of the solution. The voltage produced by the cell may be measured by any suitable means, such as shown in Fig. 3, for example, and generically indicated in Fig. 9 by the device M.

While I have illustrated preferred arrangements, it is to be understood my invention is not limited thereto but is coextensive in scope with the appended claims.

I claim:

1. An ion-concentration cell comprising a hydrogen-ion electrode, a reference electrode, and a flow-channel comprising separate chambers for said electrodes, an inlet for the hydrogen-ion electrode chamber so disposed that solution entering the flow-channel directly impinges on the active surface of the hydrogen-ion electrode, and a connection for conducting solution from said hydrogen-ion electrode chamber to the reference electrode chamber.

2. An ion-concentration cell comprising a hydrogen-ion electrode, a reference electrode, and a flow-channel comprising separate chambers for said electrodes, an inlet for the hydrogen-ion electrode chamber so disposed that solution entering the flow channel directly impinges on the active surface of the hydrogen-ion electrode, a connection for conducting solution from said hydrogen-ion electrode chamber to the reference electrode chamber, and a second connection for discharging solution from said hydrogen-ion electrode chamber.

3. An ion-concentration cell comprising a hydrogen-ion electrode, a reference electrode, and a flow-channel comprising separate chambers for said electrodes, an inlet for the hydrogen-ion electrode chamber so disposed that solution entering the flow-channel directly impinges on the active surface of the hydrogen-ion electrode, outlet conduits for said hydrogen-ion electrode chamber, one of which transfers solution to the reference electrode chamber, and a discharge outlet for said reference electrode chamber.

4. An ion-concentration cell comprising a reference electrode, a hydrogen-ion electrode whose active surface comprises a glass bulb, a flow-channel having a chamber for receiving said hydrogen-ion electrode, the internal wall of said chamber being closely spaced from and of shape generally like that of said bulb to provide a restricted passage, and an inlet to said passage below said bulb so disposed that the incoming solution, whose ion-concentration is to be determined, impinges directly and immediately upon and in turbulent flow sweeps over all of said active surface.

5. An ion-concentration cell comprising a reference electrode, a hydrogen-ion electrode whose active surface comprises a glass bulb, a flow-channel having a chamber for receiving said hydrogen-ion electrode, the internal wall of said chamber being closely spaced from, and of shape generally like that of, said bulb to provide a restricted passage, and an inlet to said passage below said bulb so disposed that the incoming solution, whose ion-concentration is to be determined impinges directly and immediately upon and in turbulent flow sweeps over all of said active surface, a separate flow channel having a chamber for receiving said reference electrode, an outlet above said active surface, and a connection for conducting solution from said outlet to the reference-electrode chamber.

6. A system for determining the ion-concentration of a solution comprising an ion-concentration cell having a reference electrode and a hydrogen-ion electrode including a glass tube having at its lower end a thin bulb whose wall forms the active surface of said electrode, a chamber having an inlet at its lower end, a wall adjacent said inlet of substantially the same shape as said bulb, means supporting said tube in said chamber with said bulb closely adjacent said inlet so that incoming solution impinges directly and immediately upon, and in turbulent flow sweeps over, said active surface, and an outlet for said chamber disposed above said bulb.

GEORGE A. PERLEY.